UNITED STATES PATENT OFFICE.

EDWIN O. BARSTOW, OF MIDLAND, MICHIGAN, ASSIGNOR TO THE DOW CHEMICAL COMPANY, OF MIDLAND, MICHIGAN, A CORPORATION OF MICHIGAN.

METHOD OF MAKING MAGNESIUM CHLORID AND THE LIKE.

1,305,641.     Specification of Letters Patent.     Patented June 3, 1919.

No Drawing.     Application filed June 6, 1916. Serial No. 101,923.

*To all whom it may concern:*

Be it known that I, EDWIN O. BARSTOW, a citizen of the United States, and a resident of Midland, county of Midland, State of Michigan, have invented a new and useful Improvement in Methods of Making Magnesium Chlorid and the like, of which the following is a specification, the principle of the invention being herein explained and the best mode in which I have contemplated applying that principle, so as to distinguish it from other inventions.

The present improved method of manufacture has as its object the production of magnesium chlorid, either in solid form or in solution, from any brine containing calcium chlorid, as for instance from the natural brines which occur in the Michigan district, and contain, in addition to calcium chlorid, magnesium chlorid and sodium chlorid, as well as a trace of iron chlorid. The object of the present invention is to not merely secure the magnesium chlorid as an ultimate product, but incidentally to produce by-products of value, thereby obviously decreasing the cost of manufacture of both such products. To the accomplishment of the foregoing and related ends, said invention, then, consists of the steps hereinafter fully described and particularly pointed out in the claims.

The following description sets forth in detail certain steps embodying the invention, such described steps constituting, however, but several of the various ways in which the principle of the invention may be used.

In carrying out my improved method, where working with a brine containing sodium and magnesium chlorids in addition to calcium chlorid, I first treat the brine with sulfuric acid, whereby the calcium chlorid is precipitated as calcium sulfate with the formation of hydrochloric acid in solution in accordance with the following reaction:—

$$CaCl_2 + H_2SO_4 + 2H_2O = CaSO_4.2H_2O + 2HCl.$$

The calcium sulfate resulting from the foregoing reaction is separated from the mixture by filtration, and after being washed with water gives a product commercially used as a paper filler.

The filtrate remaining contains, then, sodium chlorid, magnesium chlorid and hydrochloric acid, together with a little calcium sulfate, due to the solubility of the latter in the presence of the acid brine. To such solution, I then add a magnesium compound capable of neutralizing hydrochloric acid to form magnesium chlorid, such for example as magnesium oxid, carbonate or hydrate, said compound being added in quantity sufficient to neutralize the free hydrochloric acid present in such solution. In practice I prefer to use the latter, the reaction then being as follows:—

$$2HCl + Mg(OH)_2 = MgCl_2 + 2H_2O.$$

As indicated, the hydrochloric acid reacts with the magnesium hydrate to form magnesium chlorid, and at the same time the neutralization of such acid decreases the solubility of the calcium sulfate which was in solution, causing a considerable portion of it to be precipitated as calcium sulfate ($CaSO_4.2H_2O$), although there still remains a small quantity in the solution. For some uses the presence of this small quantity of the calcium sulfate is not objectionable, and in such case the residual solution may be at once evaporated until the sodium chlorid separates out, this taking place at a gravity of about 34° Bé. The magnesium chlorid mother liquor thus left may then, in turn, be evaporated down until it corresponds in composition to magnesium chlorid with water of crystallization represented by the formula ($MgCl_2.6H_2O$) when it may be drawn off into drums and allowed to cool and solidify.

In case, however, it is preferred to remove the last of the calcium in solution, this may be accomplished by adding magnesium sulfite to such solution, the resulting reaction being represented as follows:—

$$CaSO_4 + MgSO_3 = MgSO_4 + CaSO_3.$$

The magnesium sulfate, which thus results, will of course remain and appear in the magnesium chlorid which forms the final product, but the quantity will be very small and is not as objectionable as would be the calcium sulfate.

Where it is desired to produce magnesium carbonate from magnesium chlorid, it is not necessary to evaporate the solution to remove the salt, but magnesium carbonate can be precipitated directly from the brine by means of sodium carbonate and then separated from the salt brine by filtration and washing.

The order of procedure hereinbefore described may, if desired, be varied, using, however, the same materials to produce the same results. Thus sulfuric acid may be neutralized by means of magnesium hydrate to produce a solution of magnesium sulfate in accordance with the following reaction:—

$$H_2SO_4 + Mg(OH)_2 = MgSO_4 + 2H_2O$$

The solution of magnesium sulfate thus obtained may then be added to the calcium chlorid containing brine to form magnesium chlorid and calcium sulfate, thus:—

$$MgSO_4 + CaCl_2 + 2H_2O = MgCl_2 + CaSO_4.2H_2O$$

Instead of using sulfuric acid as in the two alternative modes of carrying out the invention which have been described, a suitable acid sulfate may be employed, as for example niter cake which is sodium acid sulfate ($NaHSO_4$). The reaction, where such niter cake is added directly to the chlorid in place of sulfuric acid may be represented as follows:—

$$NaHSO_4 + CaCl_2 + 2H_2O = CaSO_4.2H_2O + NaCl + HCl$$

The solution thus obtained is substantially the same as that produced by the first reaction hereinbefore stated except that there will be an additional quantity of common salt, that is sodium chlorid, in the solution, and only half a quantity of hydrochloric acid. From this point on the procedure will be exactly the same as that first outlined, namely, the hydrochloric acid containing brine is neutralized with magnesium hydrate to form magnesium chlorid.

Just as in the case where sulfuric acid is employed, so in the case of this acid sulfate, the solution of the latter, e. g. niter cake, may be first neutralized with magnesium hydrate, forming a solution of magnesium sulfate and sodium sulfate according to the following reaction:—

$$2NaHSO_4 + Mg(OH)_2 = MgSO_4 + Na_2SO_4 + 2H_2O.$$

This solution of mixed sulfates may then be added to a calcium chlorid brine, whereupon magnesium chlorid is formed in accordance with the following reaction:—

$$MgSO_4 + Na_2SO_4 + 2CaCl_2 + 2H_2O = 2CaSO_4.2H_2O + 2NaCl + MgCl_2.$$

It will be obvious from the last described two modifications of my process that to all intents and purposes the acid sulfate reacts in the same fashion as would the sulfuric acid by itself. In fact such acid sulfate may be considered as the equivalent of such sulfuric acid in all respects save that of quantitative relation.

Other modes of applying the principle of my invention may be employed instead of the one explained, change being made as regards the process herein disclosed, provided the step or steps stated by any one of the following claims or the equivalent of such stated step or steps be employed.

I therefore particularly point out and distinctly claim as my invention:—

1. The method of making magnesium chlorid from a solution containing calcium chlorid, which consists in reacting between such chlorid, magnesium hydrate and a compound carrying an available acid sulfate component, in such order as to precipitate calcium sulfate and leave magnesium chlorid in solution, substantially as described.

2. The method of making magnesium chlorid from a solution containing calcium chlorid, which consists in reacting between such chlorid, magnesium hydrate and sulfuric acid, in such order as to precipitate calcium sulfate and leave magnesium chlorid in solution, substantially as described.

3. In a method of making magnesium chlorid from a brine containing calcium chlorid, the steps which consist in adding sulfuric acid to such brine, whereby calcium sulfate is precipitated with formation of hydrochloric acid in solution; separating out such calcium sulfate; and adding to the solution a magnesium compound adapted to neutralize such acid with formation of magnesium chlorid.

4. In a method of making magnesium chlorid from a brine containing calcium chlorid in addition to magnesium chlorid, the steps which consist in adding sulfuric acid to such brine, whereby calcium sulfate is precipitated with formation of hydrochloric acid in solution; separating out such calcium sulfate; adding to the solution a magnesium compound adapted to neutralize such acid with formation of additional magnesium chlorid; and then segregating the magnesium chlorid in the solution.

5. In a method of making magnesium chlorid from a brine containing sodium chlorid and calcium chlorid in addition to magnesium chlorid, the steps which consist in adding sulfuric acid to such brine, whereby calcium sulfate is precipitated, with formation of hydrochloric acid in solution; separating out such calcium sulfate; adding to the solution a quantity of magnesium hydrate sufficient to neutralize such hydrochloric acid with formation of additional magnesium chlorid; and then separating the sodium chlorid from the magnesium chlorid thus left in the solution.

6. In a method of making magnesium chlorid from a brine containing sodium chlorid and calcium chlorid in addition to magnesium chlorid, the steps which consist in adding sulfuric acid, whereby calcium sulfate is precipitated with formation of hydrochloric acid in solution, a little calcium sulfate also going into solution; separating out such precipitated calcium sulfate; adding to the solution a quantity of magnesium hydrate sufficient to neutralize such hydrochloric acid, with formation of additional magnesium chlorid; precipitating, in the form of calcium sulfite, any calcium remaining in solution; and then separating the sodium chlorid from the magnesium chlorid thus left in the solution.

7. In a method of making magnesium chlorid from a brine containing sodium chlorid and calcium chlorid in addition to magnesium chlorid, the steps which consist in adding sulfuric acid, whereby calcium sulfate is precipitated with formation of hydrochloric acid in solution, a little calcium sulfate also going into solution; separating out such precipitated calcium sulfate; adding to the solution a quantity of magnesium hydrate sufficient to neutralize such hydrochloric acid, with formation of additional magnesium chlorid; precipitating any calcium sulfate remaining in solution by reacting on it with magnesium sulfite, thereby forming calcium sulfite and magnesium sulfate; evaporating the remaining solution to a point where the sodium chlorid crystallizes out; and then removing such crystallized sodium chlorid, leaving the magnesium chlorid in solution with a slight admixture of magnesium sulfate.

Signed by me, this 13th day of April, 1916.

EDWIN O. BARSTOW.

Attested by—
C. E. BARNES,
J. P. HOLMES.